(12) United States Patent
Herrmann

(10) Patent No.: US 12,456,906 B2
(45) Date of Patent: Oct. 28, 2025

(54) METHOD FOR REWORKING A FAULTY WELDED JOINT OF A HAIRPIN WINDING

(71) Applicant: AUDI AG, Ingolstadt (DE)

(72) Inventor: Patrick Herrmann, Pfaffenhofen (DE)

(73) Assignee: AUDI AG, Ingolstadt (DE)

( * ) Notice: Subject to any disclaimer, the term of this patent is extended or adjusted under 35 U.S.C. 154(b) by 467 days.

(21) Appl. No.: 17/925,080

(22) PCT Filed: May 12, 2021

(86) PCT No.: PCT/EP2021/062566
§ 371 (c)(1),
(2) Date: Nov. 14, 2022

(87) PCT Pub. No.: WO2021/249713
PCT Pub. Date: Dec. 16, 2021

(65) Prior Publication Data
US 2023/0198351 A1    Jun. 22, 2023

(30) Foreign Application Priority Data
Jun. 8, 2020   (DE) .................. 10 2020 115 124.1

(51) Int. Cl.
*H02K 15/50*    (2025.01)
*B23K 9/16*     (2006.01)

(52) U.S. Cl.
CPC ............... *H02K 15/50* (2025.01); *B23K 9/16* (2013.01)

(58) Field of Classification Search
CPC .......... H02K 15/50; H02K 15/35; B23K 9/16; B23K 31/125
See application file for complete search history.

(56) References Cited

U.S. PATENT DOCUMENTS

2002/0033649 A1* 3/2002 Oohashi .................. H02K 3/28
                                                    310/201
2006/0006156 A1   1/2006 Huonker et al.
(Continued)

FOREIGN PATENT DOCUMENTS

CN    105215623 A    1/2016
CN    109922920 A    6/2019
(Continued)

OTHER PUBLICATIONS

Office Action issued on Nov. 16, 2023, in corresponding European Application No. 21726375.5, 12 pages.
(Continued)

*Primary Examiner* — Jeffrey T Carley
*Assistant Examiner* — Jose K Abraham
(74) *Attorney, Agent, or Firm* — Maier & Maier, PLLC

(57) ABSTRACT

A method for reworking a defective welded connection of a hairpin winding for a rotor or stator of an electrical machine, including providing the hairpin winding applied to a winding support. The hairpin winding has at least one conductor formed from multiple conductor sections. The conductor sections of the respective conductor are welded in pairs at a respective welded connection by a first welding method, and at least one of the welded connections is a defective welded connection. The defective welded connection is severed, and the conductor sections to be welded, which were previously connected by the defective welded connection, are connected by way of a connecting method that differs from the first welding method.

11 Claims, 1 Drawing Sheet

(56) References Cited

U.S. PATENT DOCUMENTS

| | | | | |
|---|---|---|---|---|
| 2008/0054750 A1* | 3/2008 | Koike | ................... | B23K 35/02 |
| | | | | 219/145.23 |
| 2013/0075371 A1 | 3/2013 | De Souza et al. | | |
| 2015/0202708 A1 | 7/2015 | Aoki et al. | | |
| 2017/0257002 A1* | 9/2017 | Ishizuka | ................ | H02K 15/33 |
| 2019/0199153 A1 | 6/2019 | Nishimura et al. | | |
| 2019/0210158 A1 | 7/2019 | Kamiyama et al. | | |
| 2021/0402519 A1* | 12/2021 | Okita | ................... | B23K 26/34 |
| 2022/0118559 A1* | 4/2022 | Mohri | ................ | B23K 26/0884 |

FOREIGN PATENT DOCUMENTS

| | | |
|---|---|---|
| DE | 60129902 T2 | 5/2008 |
| DE | 102016218431 A1 | 3/2018 |
| DE | 102018200035 A1 | 7/2019 |
| EP | 1618984 B1 | 9/2006 |
| EP | 1700663 A2 | 9/2006 |
| EP | 3051669 B1 | 8/2018 |
| WO | 9930405 A1 | 6/1999 |
| WO | WO-9929026 A1 * | 6/1999 ........... H01F 27/288 |

OTHER PUBLICATIONS

Rüge., "Handbook of Welding Technology", J. Complaint, 1993, Third, revised edition, vol. II: Processes and manufacturing, 44 Pages.

Examination Report issued on Jan. 29, 2021, in corresponding German Application No. 102020115124.1, 10 pages.

International Search Report and Written Opinion issued on Sep. 7, 2021, in corresponding International Application No. PCT/EP2021/062566, 13 pages.

International Preliminary Report on Patentability issued on Dec. 13, 2022, in corresponding International Application No. PCT/EP2021/062566, 12 pages.

Office Action issued on Apr. 30, 2025, in corresponding Chinese Application No. 202180040133.X, 10 pages.

* cited by examiner

METHOD FOR REWORKING A FAULTY WELDED JOINT OF A HAIRPIN WINDING

FIELD

The invention relates to a method for reworking a defective welded connection of a hairpin winding for a rotor or stator of an electrical machine.

BACKGROUND

In electrical machines, thus, for example, in motors or generators, a stator with coils attached to it is typically used in order to drive a rotor by supplying the coils with current that varies over time, or to convert a magnetic field that varies over time due to rotation into an induction current. In this case, for example, a cylindrically shaped winding support can be used, which has a plurality of slots extending in the axial direction, through which a conductor forming the coils is guided. In principle, it is possible to wind separate windings around each of the coil teeth delimiting the slots. However, it can be advantageous to guide a continuous conductor meandering through multiple slots.

In the case of electrical machines having a high power density, for example in the case of drive units for motor vehicles, a so-called hairpin design is now often used in order to manufacture windings of this type meandering through slots. Here, a profile wire, usually a rectangular wire, is first bent into a U-shape, i.e., into the shape of a "hairpin". The legs of this hairpin are then arranged in a circle and inserted into the slots of a laminated stator core. In the next step, the free ends of the respective hairpins are twisted concentrically to the stator axis or to the axis of rotation of the electrical machine by a defined angle. All ends that are located on a particular diameter, that is to say on a specific position in the slots, are twisted alternately clockwise and counterclockwise. This is also known as "twisting". The adjacent ends are conductively connected to one another. Depending on the winding scheme, connecting bridges are placed on the winding head and conductively connected to the corresponding ends of hairpins in order to interconnect the hairpins to form an overall winding. If necessary, the pin ends are then insulated and the entire stator is impregnated. This technology enables a high level of automation and a high copper fill factor in the stator slots, i.e., a high ratio between copper area and slot area. This hairpin design is used, for example, in document DE 10 2018 200 035 A1. In order to achieve high throughputs, the conductive connections between the individual hairpins are often produced by welding, for example by laser welding.

When welding hairpin windings for a rotor or stator, a very large number of welded connections, typically more than 200 welded connections, are required. As a result, even very low defect rates in the welding method can result in a high level of rejects. For example, a defect rate of approximately 0.5% would result in an average of one welded connection per stator being defective. If, for example, 200 stators are to be manufactured per day and each of these stators has 216 welds, even at a defect rate of 0.1% per welding method, this would still result in up to 432 defective stators being rejected per day. Since such a high level of rejects is to be avoided for both economic and ecological reasons, it makes sense to use a reworking solution in which defective welds are reworked as much as possible in order to obtain a fully functional stator. This applies similarly to the production of rotors having applied hairpin windings.

In the simplest case, the reworking would be carried out by laser welding, which is typically also used to produce the original welded connection. In this case, however, it is problematic that the first defective weld changes the present welding situation in an undefined manner for the reworking, since the surface resulting from the defective weld is unknown. This typically has the result that the surface is no longer perpendicular to the incident laser, which, in conjunction with the fact that the copper often used for such windings already has a relatively low absorption for infrared lasers in any case, results in a low energy input. This results in a different energy input for different welding methods during such reworking, which in turn can again result in defective welded connections or an undefined conduction behavior of the winding.

SUMMARY

The invention is therefore based on the object of specifying a solution that is improved in comparison thereto for the reworking of defective welded connections of a hairpin winding.

The object is achieved according to the invention by a method for reworking a defective welded connection of a hairpin winding for a rotor or stator of an electrical machine, which comprises the following steps:

providing the hairpin winding applied to a winding support, wherein the hairpin winding has at least one conductor formed from multiple conductor sections, wherein the conductor sections of the respective conductor are welded in pairs at a respective welded connection by a first welding method, wherein at least one of the welded connections is a defective welded connection, severing the defective welded connection, and connecting the conductor sections to be welded, which were previously connected by the defective welded joint, by way of a connecting method that differs from the first welding method, in particular by way of a second welding method.

According to the invention, the defective welded connection is first severed, in particular by cutting off the area having the welded connection. As a result, a defined geometry of the ends of the conductor sections to be connected can be provided, so that the problems explained at the outset with regard to an undefined starting geometry for reworking can be avoided.

If no further measures were taken, this would result in the problem that relatively high energy inputs take place in conventional welding methods for producing hairpin windings, for example in laser welding. However, severing the defective welded connection, for example, if this is carried out by cutting it to length, can result in the stripped length being less than with the original welding, so that a renewed welding method using the same welding method, due to the shorter distance to an insulation of the conductor sections, would potentially result in damage to this insulation, which in turn would result in a defective stator or rotor.

In addition, a significantly different shape, in particular a significantly different length in the axial direction of the rotor or stator, would result for the reworked welded connection than for non-reworked welded connections, which can be disadvantageous for subsequent steps, for example for the insulation of the welded connections.

Therefore, according to the invention, a different connection method, in particular a second welding method, is used to reconnect the previously severed conductor sections. As a result, the problems mentioned above can be avoided or at least their effects can be reduced. Suitable connection methods will be discussed later.

The conductor sections can in particular be bracket-shaped, i.e., for example, can be formed by two slot sections guided through a respective slot of the winding support and a connection section connecting them. Corresponding bracket-shaped conductor sections, also called hairpins, are common and known in hairpin windings. However, differently shaped conductor sections, for example linear conductor sections, also called I-pins, can also be used.

Welded connections can be defective for various reasons. For example, cavities or pores, i.e., air inclusions, can occur. With these defects, the copper cross section is reduced at the welding point, which can reduce the service life of the rotor or stator, since higher thermal stresses occur locally. In addition, mechanical stresses due to the resulting smaller connection cross section can result in the connection breaking during operation of the rotor or stator. If too much energy is introduced during welding, the insulation of the respective conductor section can be damaged, which in turn can result in a reduction in the service life of the rotor or stator. However, too little introduced welding energy can also be problematic, since this results in inadequate welding of the conductor sections, due to which a higher resistance can occur locally and thus in turn the higher thermal stress already discussed above, which can reduce the service life of the rotor or stator. Such an inadequate weld can also break more easily in the event of mechanical stresses during operation. Another possible defect is the occurrence of a welding spot having a poor geometric shape, i.e., welding points having a lateral overhang, sharp edges, or sunken beads. This can, for example, result in problems during a subsequent dipping process.

Approaches to detecting corresponding defective welded joints are known in principle and are already being used to sort out defective welded rotors or stators or to supply them to another type of reworking. Here, for example, a visual inspection can be used that can be carried out manually and/or automatically. For example, algorithms for image recognition or the like can be used. Additionally or alternatively, for example, conductivity measurements can be carried out in order to detect locally increased resistances, an examination can be carried out by way of X-ray imaging methods, in particular by way of a CT method, or the like.

As the connection method, a connection method that applies additional material to the conductor sections to be welded can be used. In this way, it is possible in particular that the resulting connection has essentially the same shape and length as other welded connections that have not been reworked, even if the defective welded connection is severed by cutting short the conductor sections. In addition, connection methods that apply additional material, as will be explained later, can be carried out at lower temperatures or introduce less energy into the conductor ends of the conductor sections than beam welding methods. In addition, the location at which the energy is introduced moves away from an insulation of the respective conductor section with increasing material introduction. Both of these factors can contribute to avoiding the previously discussed damage to the insulation that can occur during reworking, for example by laser welding.

A disadvantage of connection methods that apply additional material is that they typically require longer process times. However, this is less relevant as part of a reworking solution, so that these connection methods are still well suitable for reworking.

In welding methods, additional material can be applied by melting the welding electrode and partially applying it to the welding point. Alternatively to a second welding method, a 3D printing method, for example, can be used as the connection method, as is disclosed in document DE 10 2018 200 035 A1, already cited at the outset.

The first welding method can be a beam welding method. For example, laser welding or electron beam welding can be used. In the first welding process, in particular, exclusively material from the conductor sections is used, which is melted in order to connect them. The advantage of beam welding methods are the short achievable process times. This is particularly relevant since a large number of welded connections are to be produced during the production of the hairpin winding.

Gas metal arc welding can be used as the connection method. Here, in addition to heat input by the arc used for welding, the shielding gas used can transfer heat to the conductor sections. It can therefore be advantageous to prevent the gas from flowing down the conductor into the insulated regions of the respective conductor section by using a tool which grips around the ends of the conductor sections to be welded, for example like a collar.

As the connection method, CMT welding or metal inert gas welding or metal active gas welding can be used. Metal inert gas welding and metal active gas welding are well-known welding processes in which the electrode is partially melted off and forms a part of the welding point. These welding methods are sometimes also referred to in summary as MIG/MAG welding.

CMT welding is also a gas metal arc welding method. The term CMT welding is derived from the English expression "cold metal transfer". This welding method is a refinement of MIG/MAG welding, in which the welding wire is moved back and forth at high frequency. This improves the droplet detachment from the electrode and a lower temperature input into the conductor sections to be welded can be achieved. As a result, for example, a stripped length of the conductor ends of 5 to 6 mm can be sufficient to weld the conductor ends without damaging the insulation. Typical laser welding methods require a stripped length of approximately 10 mm.

The defective welded connection can be severed by cutting off an area comprising the defective welded connection from the conductor sections to be connected. This is also referred to as cutting to length and can be implemented, for example, by trimming the conductor ends of the conductor sections. This provides a defined surface for the connection method.

A volume of the additional material which is between 50% and 200% or between 80% and 120% of the volume of the severed area can be applied by the second connection method. By depositing approximately the same volume of material as the volume of material that was cut off, a similar shape of the reworked welded connection can be achieved as the non-reworked welded connections have, which can be advantageous for subsequent processing steps, for example isolation processes.

After the conductor sections to be connected have been connected, at least the welded connections of the winding can be immersed in a bath of insulating material in the axial direction of the rotor or the stator. For example, immersion in resin or powder coating can take place. In order to achieve uniform insulation, it is advantageous if the conductor ends of the conductor sections or the welded connections project approximately the same distance beyond the winding support. This can be achieved by applying additional material with approximately the same volume as the area cut off, as explained above.

The provision of the hairpin winding applied to a winding support can comprise the following steps:
- providing a winding support and multiple bracket-shaped conductor sections,
- axially inserting the conductor sections into the winding support in such a way that two slot sections of each conductor section extend in a respective slot of the winding support,
- bending the free ends of the slot sections in a respective direction in the circumferential direction of the winding support,
- connecting a respective free end to a free end of a respective further conductor section by way of a first welding method to form at least one conductor, wherein at least one of the welded connections is a defective welded connection.

In other words, the steps known per se for producing a hairpin winding of a rotor or stator can also be part of the method according to the invention, so that the method according to the invention can comprise defective production of the hairpin winding and subsequent reworking.

BRIEF DESCRIPTION OF THE FIGURES

Further advantages and details of the invention result from the following exemplary embodiments and the associated drawings. In the schematic figures.

DETAILED DESCRIPTION

Figure 1:
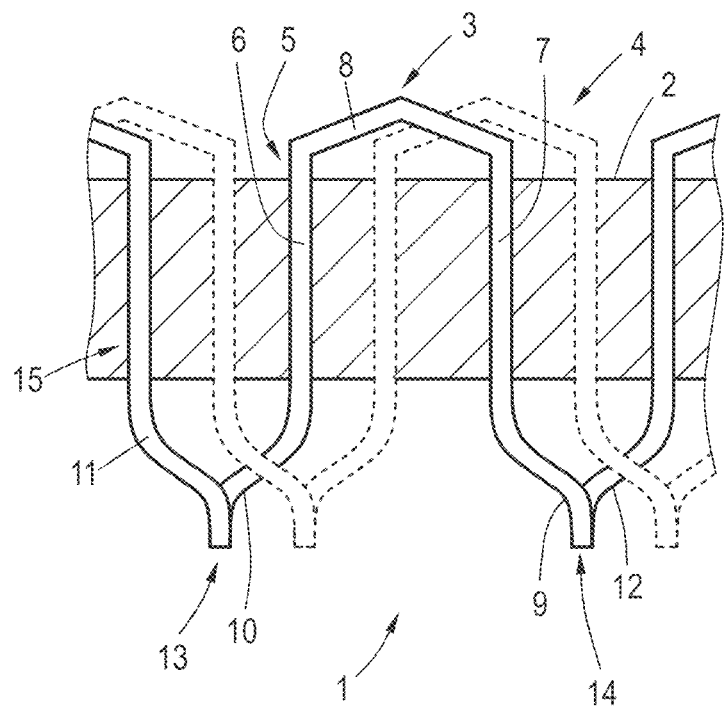
FIG. 1 shows a sectional detail view of a hairpin winding for a rotor or stator of an electrical machine.

FIG. 1 shows a detailed view of a stator 1 of an electrical machine. The stator 1 comprises a winding support 2 having multiple slots 15, which carries multiple continuous conductors 3, 4 of a hairpin winding. The conductors 3, 4 can, for example, form windings for different phases or can be be windings of one phase connected in parallel. For reasons of clarity, only two such conductors 3, 4 are shown in FIG. 1, wherein one or more conductors 3, 4 are typically used for three phases in real electrical machines.

The windings formed by the conductors 3, 4 are produced by a method in which the winding support 2 and a large number of bracket-shaped conductor sections 5 are provided, after which the conductor sections are arranged in a basket shape and are inserted axially into the winding support 2 in such a way that two slot sections 6, 7 of each conductor section 5 extend in a respective slot 15 of the winding support, wherein the slot sections 6, 7 are connected by a connecting section 8. The free ends 9 to 12 of the slot sections 6, 7 or the conductor sections 5 are bent in the manner shown in FIG. 1, so that two free ends 10, 11 or 9, 12 come to rest directly adjacent to one another. This is also known as twisting. The free ends 10, 11 and 9, 12 are then welded by a first welding method, for example laser welding or another beam welding method, to produce respective welded connections 13, 14.

In the procedure described, a large number of welded connections 13, 14 are produced between different conductor sections 5, for example more than 200 welded connections, so that even with a relatively low error rate of the welding method of, for example, 0.1%, there is a relatively high proportion of defective stators in which at least one of the welded connections 13, 14 is defective.

Defective welded connections 13, 14 can be detected, for example, by a manual or automatic inspection. It is assumed hereinafter that the welded connection 13 is defective. A method for reworking this welded connection 13 is therefore then carried out for the welded connection 13, which is explained in more detail hereinafter with reference to FIG. 2.

In this case, in step S1, the hairpin winding applied to the winding support 2 is first provided, as explained above. After the defective welded connection 13 has been detected, in step S2, an area 19 comprising the defective welded connection 13 is cut off from the conductor sections 5 to be connected or from the free ends 10, 11, for example by a cutting process.

Figure 2:
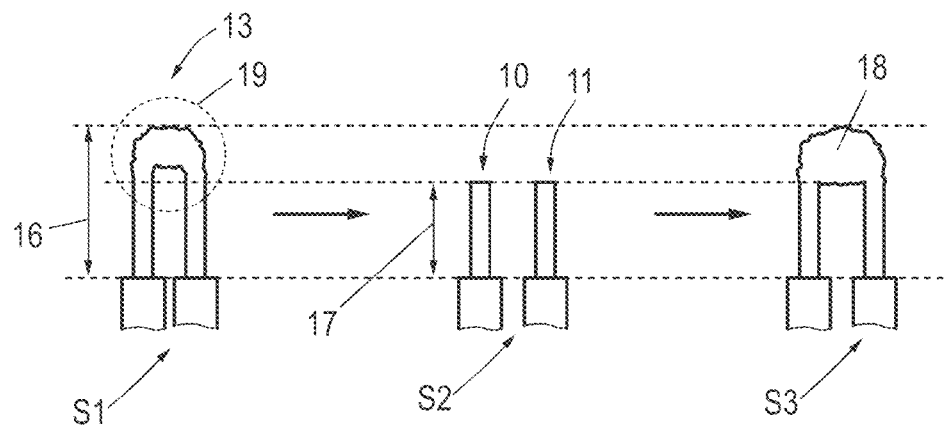
FIG. 2 shows the state of a welded connection to be reworked in various steps of an exemplary embodiment of the method according to the invention.

As can be seen in FIG. 2, the stripped length 16 of the conductor ends is reduced to a shorter stripped length 17 as a result. If a beam welding method were to be used again to reconnect the conductor sections 5 or the free ends 10, 11, this would potentially result in a large heat input in the area of the insulation, by which this can be damaged. On the other hand, after such reworking, the welded connection 13 would be considerably shorter than the non-reworked welded connections 14, which would be disadvantageous, for example, if the welded connections 13, 14 are immersed in a bath of insulating material after the connecting, since in this case the reworked welded connections 13 cannot be reliably insulated under certain circumstances.

Therefore, in step S3, a connection method differing from the first welding method, thus in particular not a beam welding method, is used to reconnect the conductor sections 5 or their free ends 10, 11. In order to avoid the above-explained disadvantages, a connection method is used here that applies additional material 18 to the conductor sections 5 to be welded or to their free ends 10, 11. Gas metal arc welding can be used as the connection method, in which the welding electrode is partially melted and forms a part of the welded connection. CMT welding can be used particularly advantageously, since in this case there is a particularly low heat input and damage to the insulation of the conductor sections 5 can thus be particularly reliably avoided.

A volume of additional material 18 is preferably applied in the connection method, which essentially corresponds to the volume of the severed region 15, so that, as can be seen in FIG. 2 from a comparison of the state in step S1 and the state after step S3, overall an at least similar shape of the welded connection 13 results as before the reworking. In particular, the stripped length 16 or the length by which the welded connection 13 protrudes beyond the winding support 2 after such reworking can essentially correspond to the corresponding lengths for other welded connections 14 for which no reworking has taken place.

After all defective welds 13 have been reworked, connection bridges can be placed and/or the welded joints 13, 14 can be insulated, for example, by immersing the welded connections in a bath of insulating material in the axial direction of the rotor or stator, respectively, in order to complete the production of the rotor or stator, respectively.

The invention claimed is:

1. A method for reworking a defective welded connection of a hairpin winding for a rotor or stator of an electrical machine, comprising:
- providing the hairpin winding applied to a winding support, wherein the hairpin winding has at least one conductor formed from multiple conductor sections, wherein the conductor sections of the respective conductor are welded in pairs at a respective welded connection by a first welding method, wherein at least one of the welded connections is a defective welded connection, severing the defective welded connection, and connecting the conductor sections to be welded, which were previously connected by the defective welded connection, by way of a connecting method that differs from the first welding method, in particular by way of a second welding method;

wherein the connection method is used as the connection method which applies additional material to the conductor sections to be welded and/or in that the first welding method is a beam welding method; and wherein a volume of the additional material is applied by the connection method that is between 50% and 200% or between 80% and 120% of the volume of the cut off area.

2. The method as claimed in claim 1, wherein gas metal arc welding is used as the connection method.

3. The method as claimed in claim 1, wherein cold metal transfer (CMT) welding or metal inert gas welding or metal active gas welding is used as the connection method.

4. The method as claimed in claim 1, wherein after the conductor sections to be connected have been connected, at least the welded connections of the winding are immersed in a bath of insulating material in the axial direction of the rotor or the stator.

5. The method as claimed in claim 1, wherein the provision of the hairpin winding applied to a winding support comprises:

providing the winding support and multiple bracket-shaped conductor sections, axially inserting the conductor sections into the winding support in such a way that two slot sections of each conductor section extend in a respective slot of the winding support, bending the free ends of the slot sections in a respective direction in the circumferential direction of the winding support, connecting a respective free end to a free end of a respective further conductor section by way of a first welding method to form at least one conductor, wherein at least one of the welded connections is a defective welded connection.

6. The method as claimed in claim 2, wherein CMT welding or metal inert gas welding or metal active gas welding is used as the connection method.

7. The method as claimed in claim 1, wherein the defective welded connection is severed by cutting off an area comprising the defective welded connection from the conductor sections to be connected.

8. The method as claimed in claim 2, wherein the defective welded connection is severed by cutting off an area comprising the defective welded connection from the conductor sections to be connected.

9. The method as claimed in claim 2, wherein after the conductor sections to be connected have been connected, at least the welded connections of the winding are immersed in a bath of insulating material in the axial direction of the rotor or the stator.

10. The method as claimed in claim 3, wherein after the conductor sections to be connected have been connected, at least the welded connections of the winding are immersed in a bath of insulating material in the axial direction of the rotor or the stator.

11. The method as claimed in claim 5, wherein after the conductor sections to be connected have been connected, at least the welded connections of the winding are immersed in a bath of insulating material in the axial direction of the rotor or the stator.

* * * * *